United States Patent [19]

Weill

[11] 4,209,047

[45] Jun. 24, 1980

[54] DEBARKER TOE ASSEMBLY

[76] Inventor: Theodore C. Weill, 110 Carol Cir., Tylertown, Miss. 39667

[21] Appl. No.: 919,761

[22] Filed: Jun. 28, 1978

[51] Int. Cl.² .............................................. B27L 1/00
[52] U.S. Cl. ................................ 144/208 E; 144/241; 403/373; 403/408; 407/48; 407/103
[58] Field of Search .................. 83/698; 144/218, 230, 144/225, 241, 208 E; 403/373, 375, 332, 408; 407/44, 45, 47, 48, 102, 103

[56] References Cited

U.S. PATENT DOCUMENTS

| 235,425 | 12/1880 | Gearon . | |
|---|---|---|---|
| 273,304 | 3/1883 | Perry . | |
| 275,890 | 4/1883 | Cross . | |
| 300,428 | 6/1884 | Zanger . | |
| 811,769 | 2/1906 | Forbes . | |
| 1,094,020 | 4/1914 | Robinson . | |
| 1,716,192 | 4/1929 | Schupp . | |
| 2,037,642 | 4/1936 | Scribner | 407/44 |
| 2,649,818 | 8/1953 | Kaiser | 407/45 |
| 2,880,771 | 4/1959 | Annis, Jr. | 144/208 E |
| 3,059,316 | 10/1962 | Bader et al. | 407/102 |
| 3,121,939 | 2/1964 | Williams | 407/103 |
| 3,213,273 | 10/1965 | Zagel . | |
| 3,318,099 | 5/1967 | Sugden . | |
| 3,629,919 | 12/1971 | Trevarrow, Jr. | 407/103 |

FOREIGN PATENT DOCUMENTS 335682 10/1903 France .
474962 10/1952 Italy .

Primary Examiner—W. Donald Bray
Attorney, Agent, or Firm—Price, Heneveld, Huizenga & Cooper

[57] ABSTRACT

A debarker toe assembly includes a holder adapted for mounting to the end of a debarking arm and a demountable toe including a debarking edge. The holder and toe include interengaging surfaces for centering and holding the pieces in precise alignment during assembly of the toe to the holder and during use in which the assembly encounters high impact forces.

1 Claim, 8 Drawing Figures

DEBARKER TOE ASSEMBLY

BACKGROUND OF THE INVENTION

The present invention relates to a debarker toe assembly for a tree debarking machine and in particular to improved means for mounting a debarker toe to a holder.

In the wood processing industry where, for example, entire trees are employed for the manufacture of wood chips used in the pulp industry, it is first necessary to debark the tree before feeding the tree to a wood chipper. Such apparatus is also used in the lumber industry where the bark must be removed before cutting the tree into sized lumber. Debarking apparatus of conventional design includes a rotating ring having several inwardly biased radially extending arms with cutting members at their ends. Logs are fed through the center of the rotating ring where the rotating arms, typically biased against the log by springs or the like, circumscribe the tree ripping the bark from the log without appreciably damaging the wood itself.

As can be appreciated, the debarking arms and cutters at their ends are subject to significant wear due to the high impact forces and abrasive contact with the tree bark. As a result, the debarking arm end referred to as the debarking toe is normally made in a two-piece assembly with a holder permanently welded to the end of the arm and a demountable toe or cutter which can be replaced relatively frequently as required. Due to the high impact and other forces encountered during operation, it has been found that the debarking toes frequently slip thereby causing accelerated wear or destruction of the toe and sometimes the holder itself.

Debarker toe assemblies of the prior art have included a single elongated projection in the toe and a similarly shaped elongated recess in the holder such that some degree of interengagement between the two members is provided to reduce slippage in one direction during operation of the machine. Such an arrangement, however, does not provide for alignment of the toe to the holder nor does it securely lock the toe and holder together to resist slippage in all directions once assembled

SUMMARY OF THE INVENTION

The present invention overcomes the difficulties of the prior art debarker toe assemblies by providing a holder and toe with interengaging non-parallel projections and recesses thereby assuring precise alignment of the toe to the holder as well as resisting relative motion between the two during operation of the machine.

These and other advantages, features, and objects of the present invention can best be understood by reference to the following description thereof together with the drawings in which:

DETAILED DESCRIPTION OF THE PREFERRED EMBODIMENT

Figure 1:
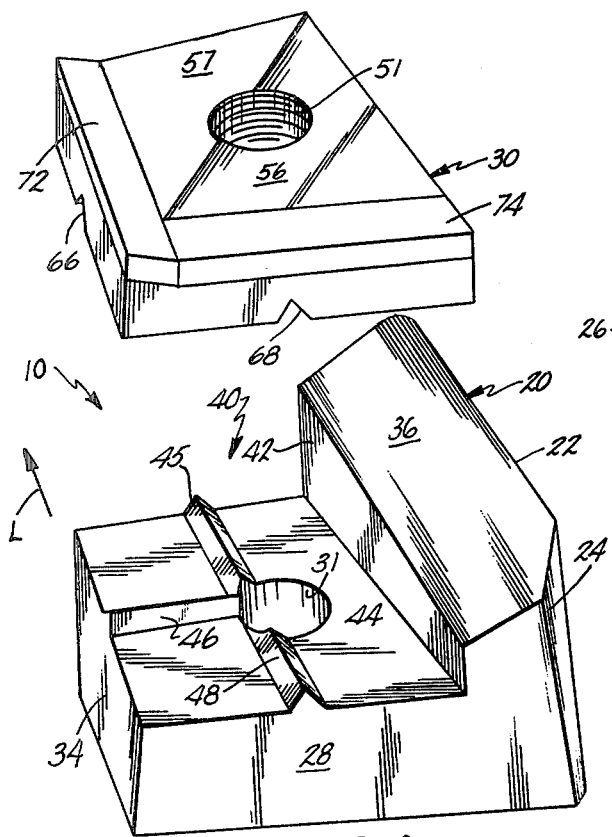
FIG. 1 is an exploded perspective view of a debarker toe assembly embodying the present invention.
Figure 2:
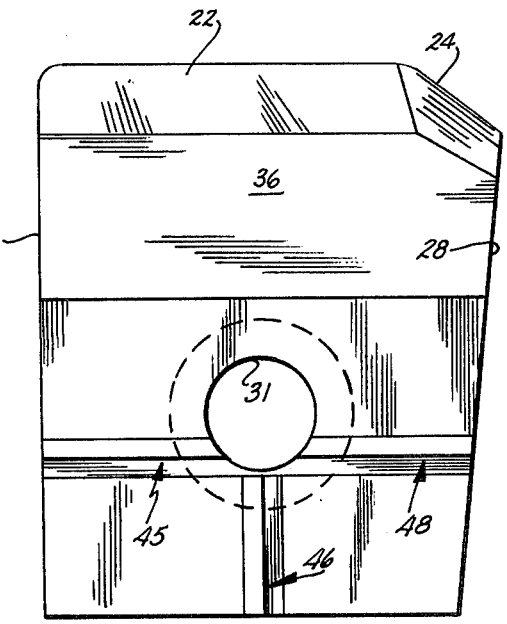
FIG. 2 is a top plan view of the holder shown in FIG. 1.

Referring initially to FIG. 1 there is shown in exploded form a debarker toe assembly 10 including a holder 20 and a demountable toe 30 which is secured to the holder and held in locked aligned fashion by means of the present invention. The holder 20 is welded to one end of a debarker arm 11 (FIG. 5) of the debarking apparatus and for such purpose it includes a slanted rear surface 22 having a beveled corner 24. Corner 24 seats against one edge of the open end of the hollow debarker arm which typically is fabricated of ¼ inch steel plate. The beveled surface 24 provides an increased contact area against which inside and outside welds 13 (FIG. 5) to the debarker arm can be made for securing the holder 20 to the arm.

Figure 5:
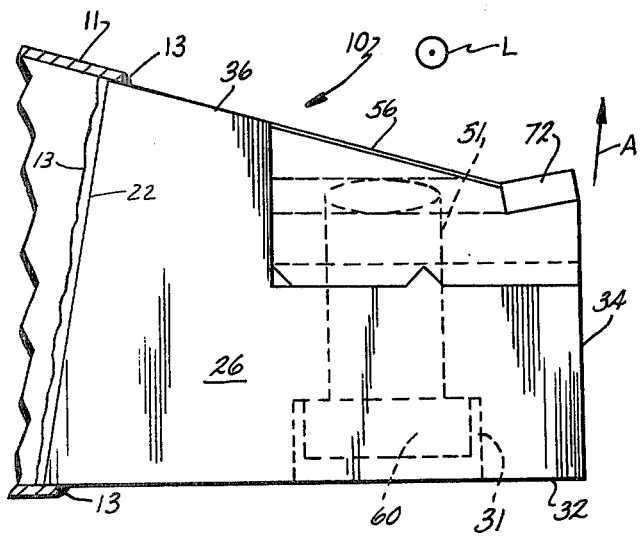
FIG. 5 is a left side elevation of the debarker toe assembly shown in FIG. 1, shown partly in cross section in an assembled position.
Figure 3:
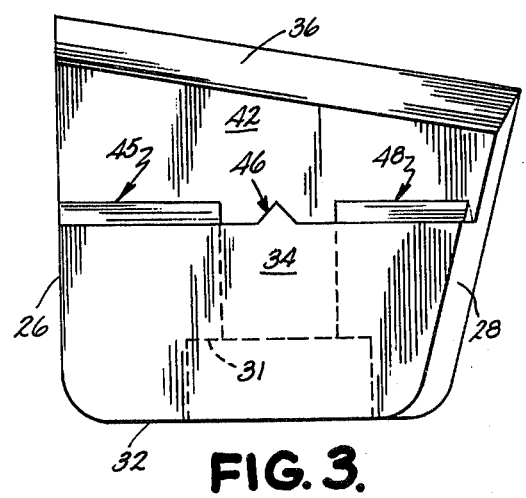
FIG. 3 is a front elevation of the holder shown in FIG. 2.
Figure 6:
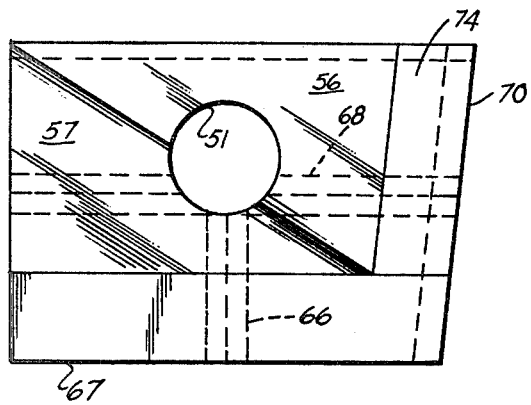
FIG. 6 is a top plan view of the toe shown in FIG. 1.
Figure 8:
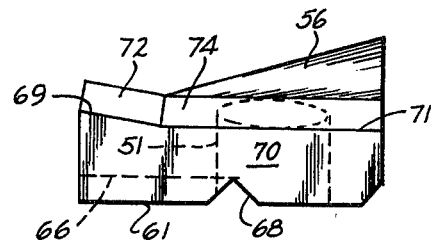
FIG. 8 is a right side elevation of the toe shown in FIG. 6.
Figure 7:
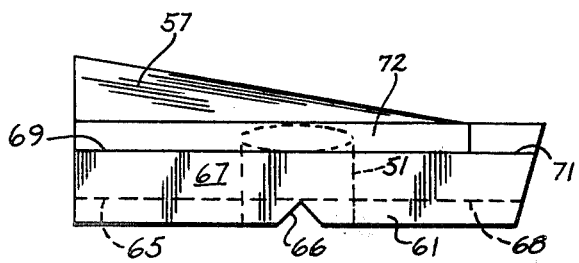
FIG. 7 is a front elevation of the toe shown in FIG. 6.
Figure 4:
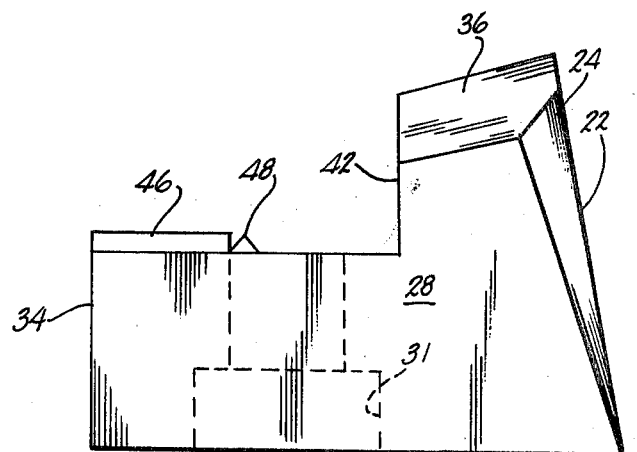
FIG. 4 is a right side elevation of the holder shown in FIG. 2.

Holder 20 further includes left and right sides 26 and 28, respectively, a substantially flat bottom surface 32 and a generally rectangular front surface 34. The holder is configured with an inclined rear top surface 36 immediately adjacent rear wall 22 and which is substantially co-planar with surface 56 of the toe 30 once the toe and holder are assembled as shown in FIG. 5 by means of a bolt 60 extending through a counterbore aperture 31 formed upwardly through the bottom surface 32 of the holder and secured within a threaded aperture 51 of the toe.

Holder 20 shown is shaped for a Beloit debarker, it being understood that holders for different debarking apparatus will take slightly different shapes in order to fit on the debarking arm of the machine. Common to all of the debarker holders, however, is a step cut formed downwardly through the top of the holder forming a large recess 40 defined by a generally vertical rear wall 42 adjacent the top surface 36 and having a floor 44 through which aperture 31 extends. In the preferred embodiment, floor 44 also includes V-shaped projections 45, 46, and 48 having upwardly inclined and converging surfaces. In the preferred embodiment, the sides of the V-shaped projections form an angle of about 130° to surface 44. At least two of V-shaped projections of the holder are arranged in non-parallel orientation with respect to one another. Thus, when the toe, having similarly arranged V-shaped notches 65, 66, and 68 (aligned with projections 45, 46, and 48, respectively) is mounted to the holder, these interengaging means resist lateral and longitudinal movement of the toe with respect to the holder.

In the preferred embodiment, projections 45 and 48 are formed along a transverse axis extending between the sides 26 and 28 of the holder while projection 46 extends orthogonally to projections 45 and 48 from the front surface 34 rearwardly to hole 31 along the center of the holder. It can be appreciated, however, that the projections and corresponding notches can be arranged in any non-parallel relationship and provide aligning and holding action although it also is appreciated that the orthogonal relationship shown in the preferred embodiment is the most effective. Holder 20, like toe 30 is cast of 6150 annealed steel.

Toe 30 is of generally rectangular configuration having a floor 61 in which the V-shaped projections 65, 66, and 68 are formed as best seen in FIGS. 1, 6, 7, and 8. Formed around the leading edge 67 and the right edge 70 of the toe are a pair of rectangular recesses 69 and 71, respectively, for receiving wear resistant inserts 72 and 74, respectively. As described more fully hereinafter, insert 72 forms the debarking or cutting edge while insert 74 provides the infeed contact portion of the debarking toe assembly. Recesses 69 and 71 are configurated to provide a floor and vertical rear surface substantially co-extensive with the rectangular tungsten carbide inserts to provide maximum mechanical strength. The inserts are brazed into the toe using a silver solder at a temperature of approximately 1100° to 1200° F.

The upper surface of toe 30 includes surface 56 which is substantially co-planar with surface 36 of the holder 20 as best seen in FIG. 5 and a trailing surface 57 inclined downwardly and away from the surface 56 as best seen in FIG. 1. Surfaces 56 and 57 are both carbide plated using conventional carbide plating techniques to provide wear resistance and thus improve the life of the toe.

The debarking toe when assembled as shown in FIG. 5 and mounted to the debarking arm rotates in a direction indicated in FIG. 5 by arrow A. Logs are fed in a direction indicated by arrow L in FIGS. 1 and 5 (i.e. into the right side of the assembly) such that the end of the log initially contacts the carbide insert 74 of the inwardly biased debarking arm. The tapered surfaces 56 and 36 contact the log which is fed into the machine by suitable powered rollers and deflect the debarking arms outwardly until the debarking edge 72 of the toe engages the outer periphery of the log. The debarking arms which are biased against the outer periphery of the log by suitable spring pressure or other biasing means then strip the bark from the log as it is fed through the rotating ring incorporating the plurality of debarking arms.

It is seen that providing the non-parallel interengaging surfaces comprising projections and recesses, respectively, between the toe and the holder, the toe is positively aligned in precise relationship with the holder when assembled and in operation provides interengaging surfaces which resist lateral and longitudinal shifting of the toe with respect to the holder which can otherwise occur with conventional debarking toe assemblies.

It is to be understood that although the projections in the preferred embodiment are formed on the holder with the corresponding recesses formed on the toe, the projections likewise could be formed on the toe with the recesses formed on the holder. Likewise, although in the preferred embodiment, V-shaped projections and recesses are provided other configurations providing surfaces extending vertically between the mating surfaces 44 and 61 of the holder and toe, respectively, can be employed. Thus, for example, the projections can be U-shaped, semi-circular, truncated triangular or the like. Also, as noted above, the angle between the respective projections (and recesses) need not be orthogonal but can be other angles so long as the desired resistance to lateral and longitudinal movement is provided. Finally, the projections and recesses need not extend in alignment with the axis of the holder or toe but can be skewed as desired.

These and other modifications to the preferred embodiment will be apparent to those skilled in the art but will fall within the scope and spirit of the present invention as defined by the appended claims.

I claim:

1. A debarker toe assembly comprising:

a debarker toe holder to be mounted to a debarker arm including a base and a slanted upstanding wall portion connected thereto facilitating mounting of said toe holder to said debarker arm, said holder further having a recess therein defined by a generally vertical wall and a generally horizontal toe receiving surface, said surface intersecting said vertical wall at a junction extending across the width of said holder base;

a toe including a debarking edge and a pair of adjacent intersecting mounting surfaces for engaging said vertical wall and said surface of said holder, wherein one surface of said toe or holder includes at least two V-shaped recesses, and one surface of the other of said toe or holder includes a pair of V-shaped projections converging to an edge for alignment and interengagement with said recesses to prevent slippage of said toe with respect to said holder during debarking and wherein one of said V-shaped recesses extends across the width of said toe or holder surface in which it is formed in spaced relationship to the remaining surface or vertical wall of said toe or holder respectively and the other of said V-shaped recess extends from an edge of said toe or holder and orthogonally intersects the first named recess, and wherein one of said pair of V-shaped projections extends across the width of said toe or holder surface on which it is formed in spaced relationship to the remaining surface or vertical wall of said toe or holder respectively and the other of said pair of V-shaped projections extends from an edge of said toe or holder and orthogonally intersects the first named projection; and aperture means formed through said toe and said holder base at the intersection of said V-shaped projections and at the intersection of said V-shaped recesses for receiving bolt means for demountably securing said toe to said holder.

* * * * *

UNITED STATES PATENT AND TRADEMARK OFFICE
CERTIFICATE OF CORRECTION

PATENT NO. : 4,209,047
DATED : June 24, 1980
INVENTOR(S) : Theodore C. Weill

It is certified that error appears in the above-identified patent and that said Letters Patent are hereby corrected as shown below:

Column 4, line 16:

"I claim" should be --The embodiments of the invention in which an exclusive property or privilege is claimed are defined as follows:

Signed and Sealed this

Twenty-eighth Day of October 1980

[SEAL]

Attest:

Attesting Officer

SIDNEY A. DIAMOND

Commissioner of Patents and Trademarks